May 3, 1927.
O. W. PETERSON
ARTIFICIAL FISHING BAIT
Filed Aug. 26, 1926
1,627,455
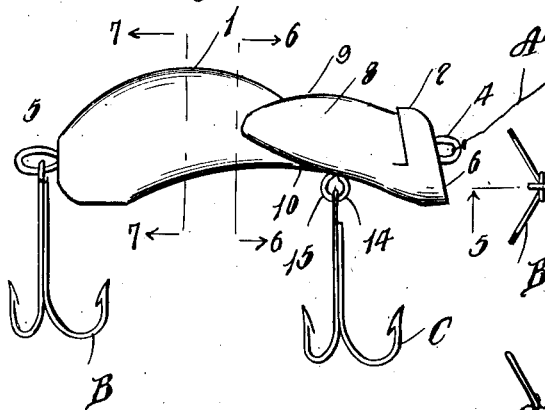
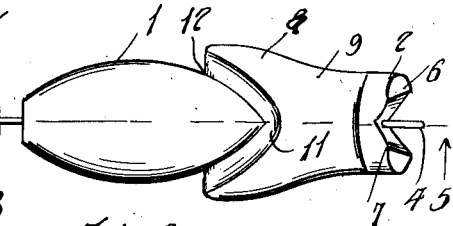
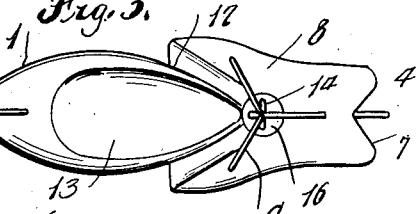
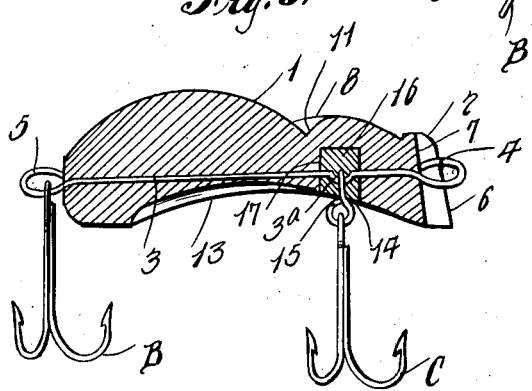
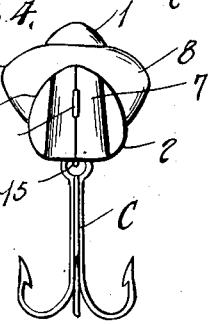
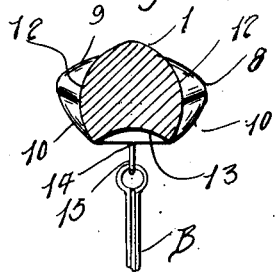
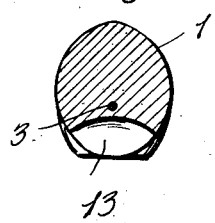
INVENTOR.
O. W. Peterson
BY
ATTORNEY.

Patented May 3, 1927.

1,627,455

UNITED STATES PATENT OFFICE.

OSCAR W. PETERSON, OF CADILLAC, MICHIGAN.

ARTIFICIAL FISHING BAIT.

Application filed August 26, 1926. Serial No. 131,694.

The invention relates to lures or bait used in fishing and has for its principal object the provision of a bait made of wood or other buoyant material and formed to resemble the head and body of an insect, a rod being run longitudinally of the head and body to reinforce it and provided with means for attaching a fishing line and fishing hooks thereto. The front portion of the bait is inclined rearwardly and upwardly and vertically grooved to normally submerge the bait against the pull of the fishing line, a weight being also embedded in the body portion forward of the longitudinal middle of the body which also has a tendency to submerge the forward portion of the bait, the action of the line pulling the bait forward assisted by the inclined front portion of the weight giving the bait an undulating movement. The undulating movement is also assisted by lateral extending portions at the rear of the head that have their upper and lower surfaces tapered on curved planes to assist in the undulating movement. Furthermore, the under side of the body is provided with an elongated concavity to give the body portion a wobbling motion.

The invention will be described in detail hereinafter and will be found illustrated in the accompanying drawings, in which—

Figure 1 is a side view in elevation of the improved bait,

Figure 2, a top plan view,

Figure 3, a bottom plan view,

Figure 4, a front view,

Figure 5, a longitudinal sectional view on the plane indicated by the line 5—5 of Figure 2, and Figures 6 and 7 are transverse sectional views on planes indicated by the lines 6—6 and 7—7, respectively, of Figure 1.

In the drawings similar reference characters will be used to designate corresponding parts throughout the several views.

The improved fishing bait or lure comprises a body portion 1 and a head portion 2 shaped to simulate an insect, and will be preferably colored to represent a yellow jacket. Extended longitudinally of the head and body portions is a rod 3 having loops 4 in the front and 5 in the rear, the loop 4 being designed to be secured to a fishing line, while the loop 5 is designed to be attached to a hook, the line being designated A and the hook B.

The front end of the head 2 is inclined rearwardly and upwardly as shown at 6, and formed with a vertically disposed groove 7. At the rear of the head portion is formed a laterally and rearwardly inclined portion 8, and the upper and lower surfaces of said portions 8 are tapered rearwardly on curved planes as indicated at 9 and 10, respectively. The rear portion of the part 8 is indented in a V-shape as shown at 11, and the walls of the V indentation are inclined downwardly and rearwardly to converge with the body portion 1 as shown at 12. This configuration of the front of the head and the planes formed by the laterally and rearwardly inclined portion 8 tends to submerge the forward end of the bait when it is drawn through the water as in trolling and the tendency of the line A to pull the bait upwardly against the submerging tendency gives the bait an undulating movement in the water and tends to attract fish to the bait.

The under side of the body portion 1 is provided with an elongated concavity 13 and the purpose of the concavity is to give the bait a wobbling movement when being drawn through the water, the effect of the concavity being an addition to the effect produced by the inclined front and the plane 8, and thus adding to the life like appearance of the bait.

The rod 3 is provided with a bend 3ª and secured to the bend 3ª is another rod 14 extending downwardly of the bait and provided with a loop 15 to which is adapted to be secured hooks C. A weight 16 is embedded in the bait forwardly of the longitudinal middle and just forward of the front end of the longitudinal concavity and preferably made of lead and molded into the body, the weight being indicated 16 and the opening therefor in which the weight is poured for molding is designated 17, the weight also preferably enclosing the rod 14 and the offset bend 3ª of the rod 3.

In the description hereinabove reference has been particularly made to trolling with the bait. It will be understood that the bait may also be used for casting although it would be preferable to maintain the bait in motion when casting.

What is claimed is:—

1. An artificial fishing bait, comprising a body portion, a head on said body portion, a portion at the rear of said head having its sides inclined laterally and rearwardly forming planes at the two sides of the body portion, the upper and under sides of said planes tapered on curved planes rearwardly, the rear of the head formed V-shaped with downwardly and rearwardly inclined surfaces, means to secure a fishing line to the head, and means to attach a hook to the body portion.

2. An artificial fishing bait, comprising a body portion, a rod extending longitudinally therethrough and adapted for attachment of a fishing line and hooks thereto, the underside of said body portion provided with a longitudinally elongated concavity, a head on said body portion having its front end inclined rearwardly and upwardly and vertically grooved, a portion at the rear of said head having its sides inclined laterally and rearwardly forming planes at the two sides of the body portion, the upper and under sides of said planes tapered on curved planes rearwardly, and a weight embedded in said body portion forwardly of the longitudinal middle of the bait.

In testimony whereof I affix my signature.

OSCAR W. PETERSON.